April 21, 1964 F. A. GRAHAM ETAL 3,129,821
HOIST FOR VEHICLE
Filed June 20, 1960 6 Sheets-Sheet 3
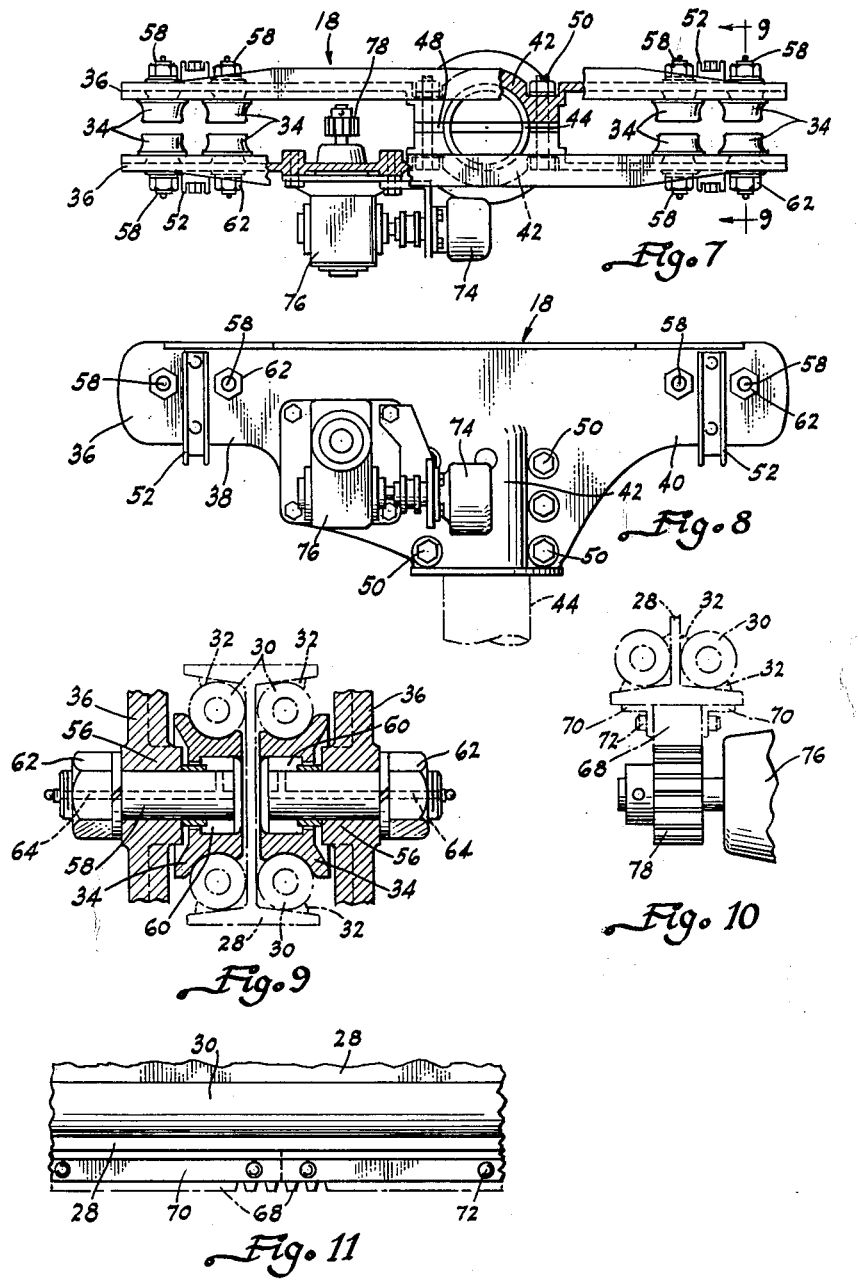
INVENTORS
FRANK A. GRAHAM
JOHN A. GEUBTNER
BY April 21, 1964 F. A. GRAHAM ETAL 3,129,821
HOIST FOR VEHICLE
Filed June 20, 1960 6 Sheets-Sheet 4
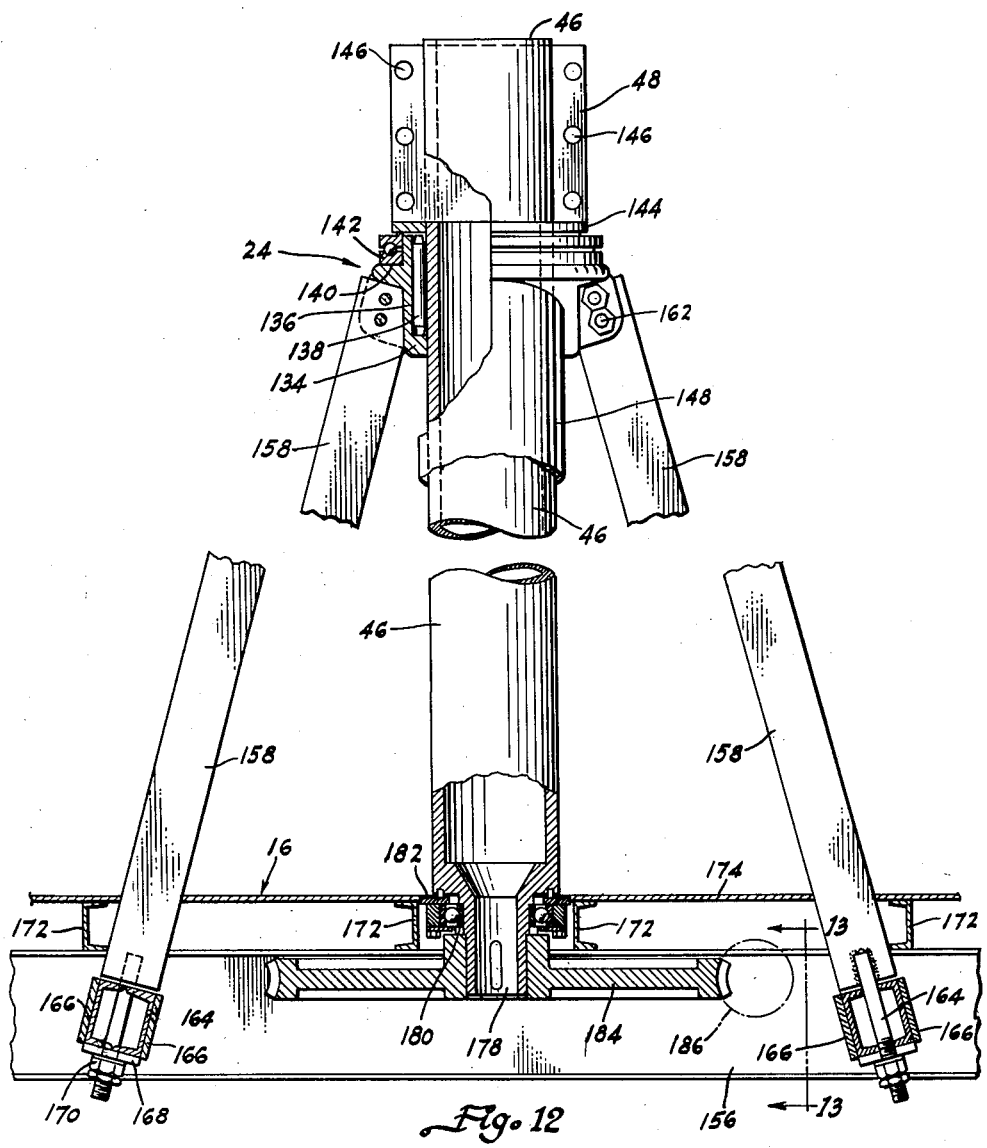
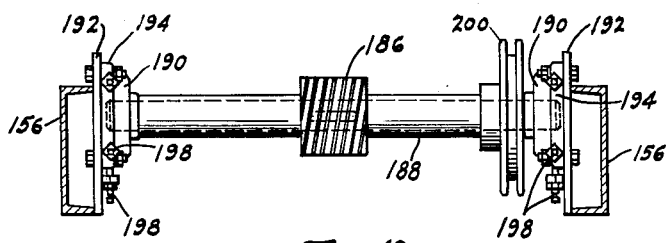
INVENTORS
FRANK A. GRAHAM
JOHN A. GEUBTNER
BY
ATTORNEY

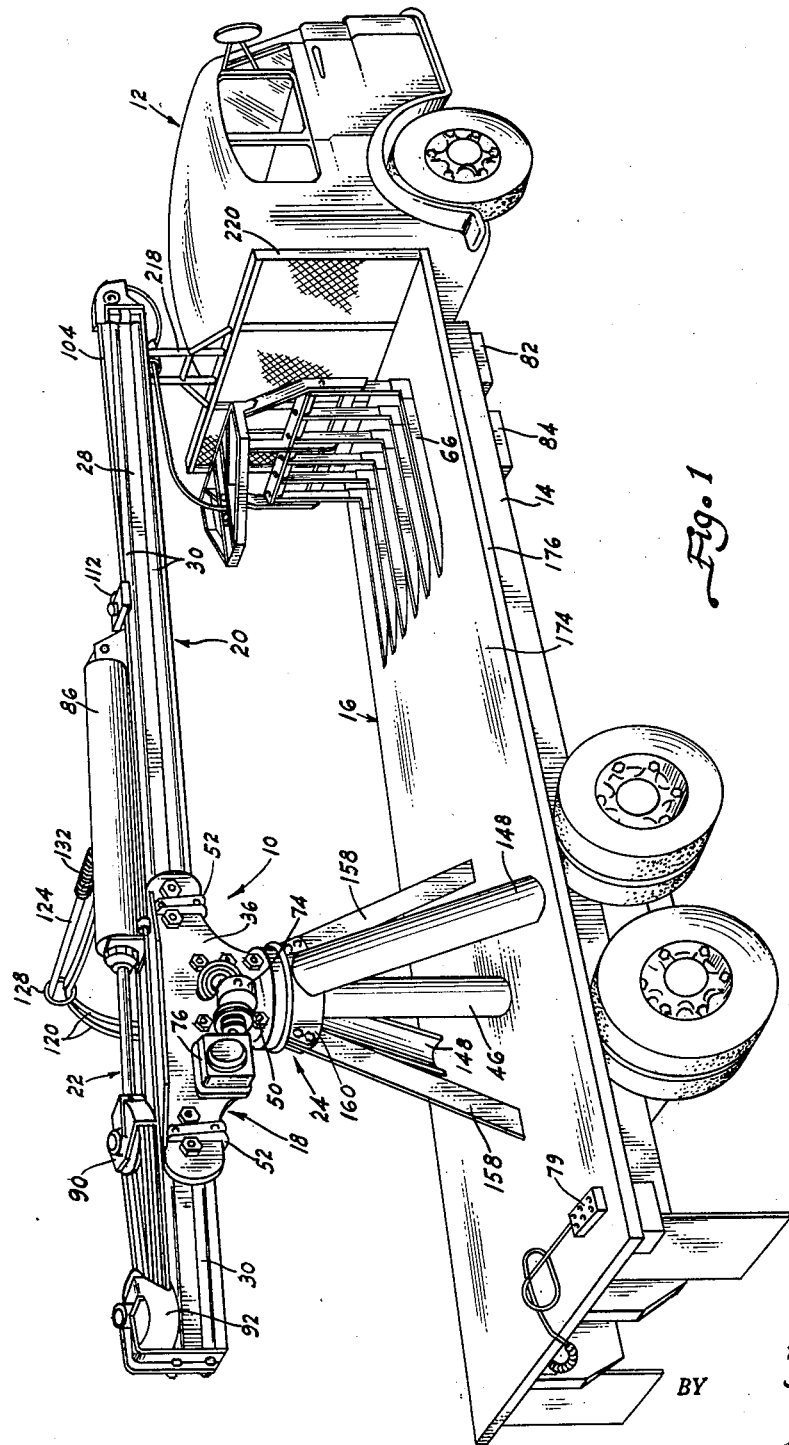

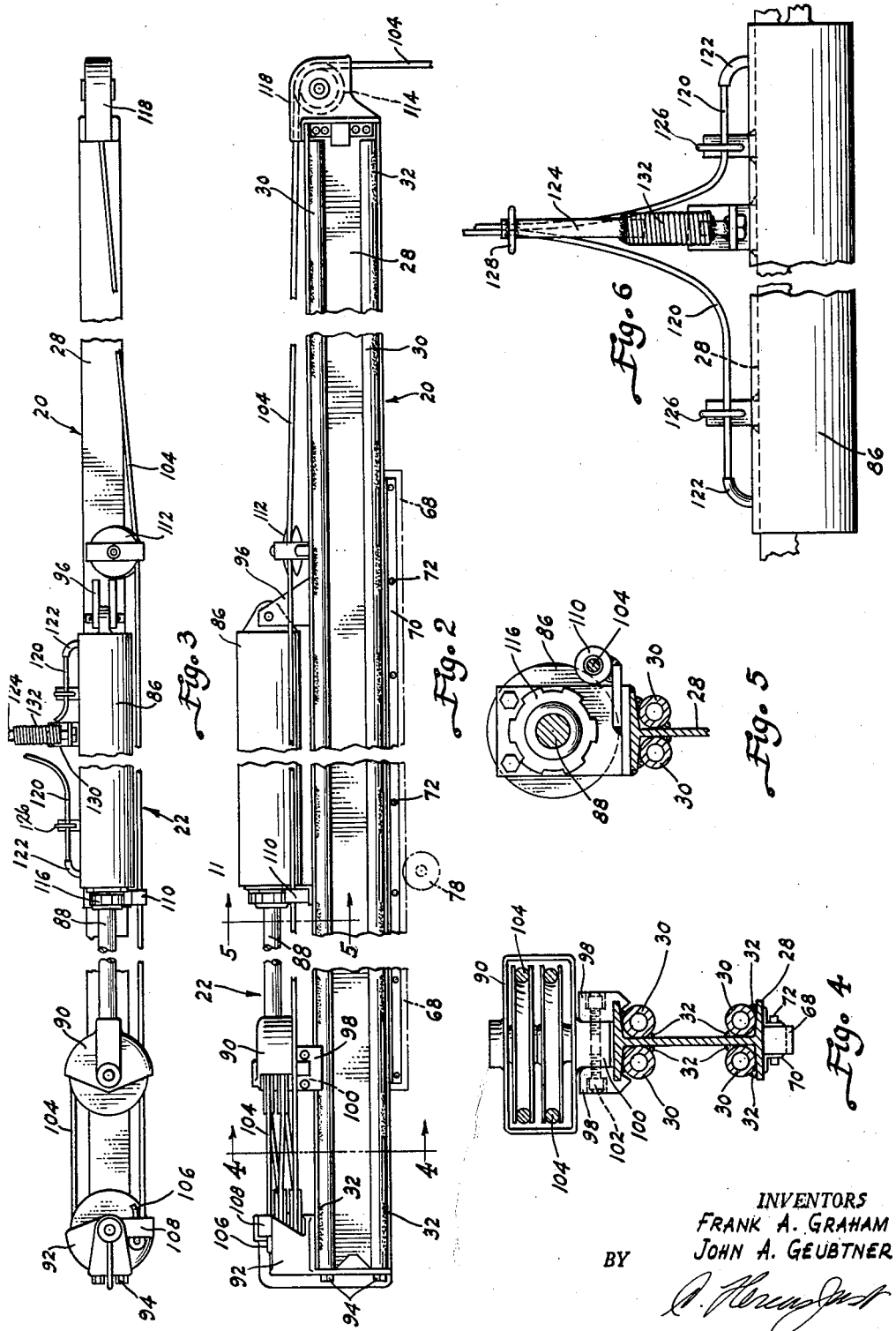

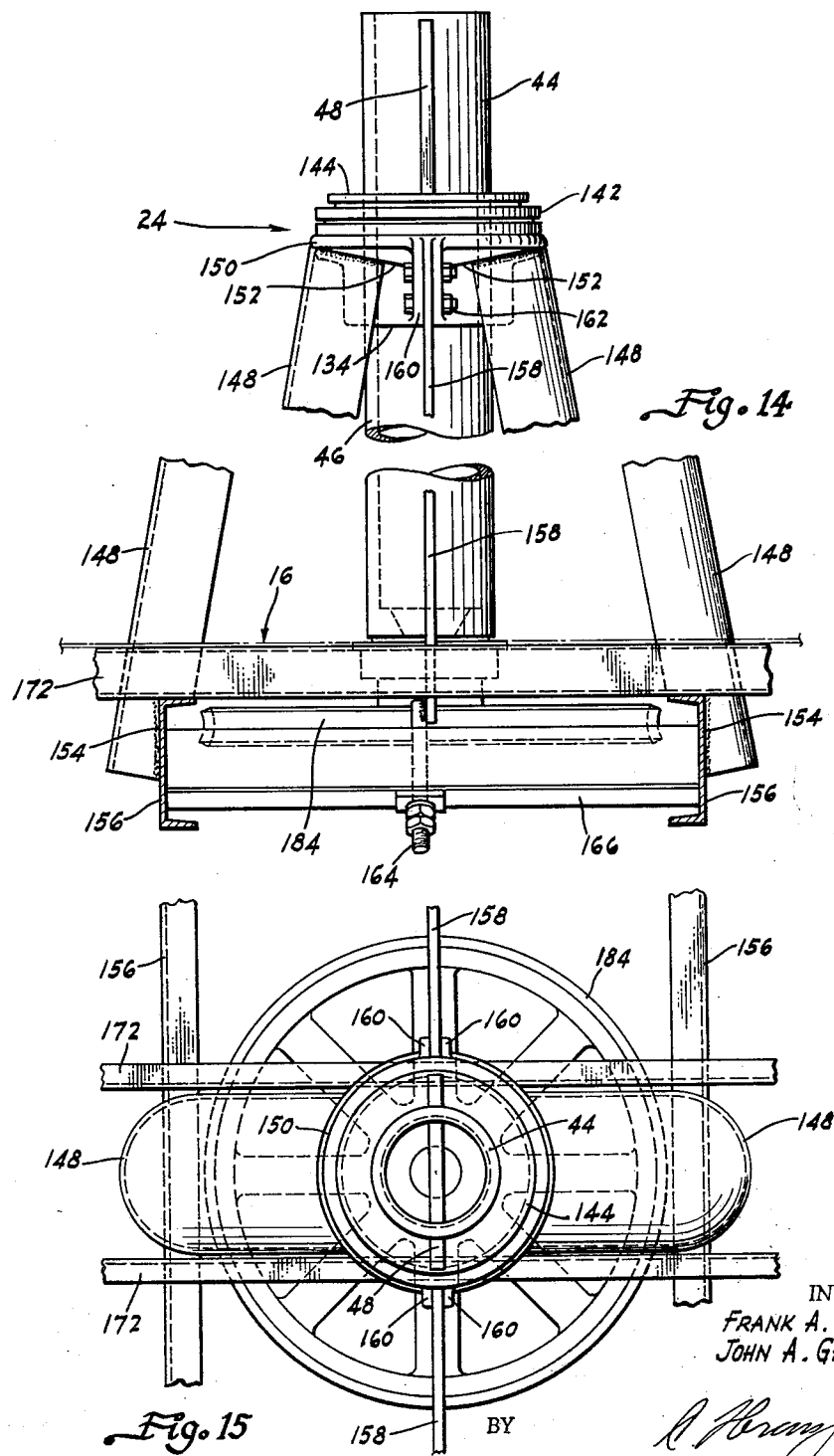

INVENTORS
FRANK A. GRAHAM
JOHN A. GEUBTNER

ATTORNEY

United States Patent Office 3,129,821
Patented Apr. 21, 1964

3,129,821
HOIST FOR VEHICLE
Frank A. Graham and John A. Geubtner, York, Pa., assignors to Side-O-Matic Unloader Corporation, York, Pa., a corporation of Pennsylvania
Filed June 20, 1960, Ser. No. 37,376
11 Claims. (Cl. 212—55)

This invention relates to improvements in a hoist for a vehicle and, more particularly, to a hoist of the type permanently attached to a vehicle so as to extend above the bed thereof and include a substantially horizontal boom which is rotatable about a fixed axis disposed intermediately of the ends and sides of the bed of the vehicle. Said hoist also includes means to receive a load, such as a cube of concrete blocks, and is operable either to unload said cubes of blocks from any position upon the bed of the vehicle onto a desired site, or if desired, also to be capable of loading material onto the bed of the vehicle.

In a number of aspects, the present invention comprises an improvement of the self-loading vehicle hoist comprising the subject matter of U.S. Reissue Patent No. 24,334, issued June 25, 1955 and comprising a reissue of U.S. Patent No. 2,772,795, issued December 4, 1956. Said reissue patent is assigned to the assignee of the instant invention.

The structure described and claimed in said reissue patent comprises a substantially horizontal boom of predetermined length which is movable about a fixed vertical axis extending above the bed of the vehicle of the type principally intended to haul concrete blocks and, more especially, concrete blocks arranged in cubes of predetermined size not exceeding four feet in width, whereby two cubes may be mounted in side-by-side relationship transversely upon the bed of the vehicle and not extend, laterally, beyond the legal bed width of eight feet which is a highway regulation in most states. A trolley moves longitudinally along the boom and supports a fork engageable with cubes of concrete blocks. Certain types of bracing means support a mast in fixed relationship relative to the bed of a vehicle and a torque member extends down the interior of the mast and is fixed to the boom, whereby said boom is rotatable by power means about its vertical axis. A specific type of supporting means for the boom engages the upper end of the mast to prevent appreciable tilting of the boom from its normal, substantially horizontal position.

It has been found that there are certain situations where a boom having a fixed overall length and fixedly connected at one end to supporting means movable about the upper end of a fixed mast, as in said patented structure, is an inconvenient arrangement, especially in unloading cubes of concrete blocks and similar goods in areas of limited size and particularly within the interior of buildings, in narrow driveways or alleys bounded by buildings on both sides, and when unloading through doorways. Hence, to provide a hoist for a vehicle and, more particularly, a hoist for a vehicle particularly designed to haul and unload cubes of concrete blocks, the present invention has been devised to include structure which permits the hoist to operate in such manner that the inadequacies of the structure covered by the aforementioned reissue patent are overcome and a highly satisfactory hoist is provided having greater latitude for operation than that covered by said reissue patent.

It is the principal object of the present invention to provide a hoist which is connectable to a vehicle, substantially permanently, and having a head rotatable about a vertical axis preferably intermediately of the sides and ends of the bed of a vehicle, said head supporting a substantially horizontal boom which is movable longitudinally in opposite horizontal directions relative to said head while being supported upon anti-friction means affording effective bracing of the boom against substantial tilting downward even when the boom is extended fully in a forward direction relative to said head and sustains a substantial load at the outer end thereof.

Another object of the invention is to provide combination track and strengthening means for the longitudinally movable boom to provide minimum weight commensurate with adequate strength to resist appreciable flexing of the boom, whereby booms of substantial length may be utilized and be capable of withstanding very appreciable loads at the forward end thereof, even when the boom is projected to its fullest permitted extent relative to the supporting head therefor.

A further object of the invention is to provide hoist cable mechanism including multiple sheave block units operable to multiply the motion of a single cable projecting over an appropriate pulley at the outer end of the boom and attachable to a load-handling means such as a fork which is engageable with a cube of cement blocks to raise and lower the same when the outer end of said cable is moved in desired vertical direction by operation of hydraulic cylinder actuating means being connected to the boom by simple and effective mechanism permitting adjustment, if desired.

Ancillary to the object set forth immediately above, it is still another object of the invention to provide mechanism capable of handling a single steel cable of adequate diameter to support substantial weights of the order of between two and three tons, for example, and yet be coiled around sheaves and pulleys of appropriate design without causing undue sharp bending or wear of the cables.

One further object of the invention is to provide improved supporting means for the head which carries the longitudinally movable boom, said supporting means, in the preferred embodiment thereof, comprising an annular collar through which a spindle extends, said spindle being connected at its upper end to said head, and said collar being fixed to the upper ends of a plurality of bracing members which effectively support said collar a substantial distance above the bed of a vehicle in a manner which resists twisting of the collar about the vertical axis of the spindle as imposed upon the collar by the head and boom when these are rotated about the axis of rotation while supporting a load at the outer end of the boom, the bracing means being of a different character from that included in the structure covered by said reissue patent and, in general, said supporting means being more simple than that covered by said reissue patent.

Details of the foregoing objects and of the invention, as well as other objects thereof, are set forth in the following specification and illustrated in the drawings comprising a part thereof.

In the drawings:
FIG. 1 is a perspective view of a mobile vehicle, specifically illustrated as an automobile truck, upon which is mounted a hoist of the type adapted to load and unload cubes of concrete blocks, for example, and embodying the principles of the present invention. In said figure, the hoist and load-supporting fork thereof is shown in idle position.

FIG. 2 is a side elevation of the boom assembly shown in FIG. 1, removed from its supporting head and broken transversely in a number of locations to foreshorten the view and illustrating details of the boom construction and the hoisting cable mechanism carried thereby.

FIG. 3 is a top plan view of the boom and hoisting cable mechanism shown in FIG. 2.

FIG. 4 is a vertical sectional view taken on the line 4—4 of FIG. 2, but on a larger scale than FIG. 2 and showing details of the cable hoisting mechanism and the boom, including track and bracing means connected to said boom.

FIG. 5 is a vertical elevation, partly in section, as seen on the line 5—5 of FIG. 2.

FIG. 6 is a fragmentary plan view of details of flexible conduit supporting means shown in FIG. 3 but employing a larger scale than in FIG. 3.

FIG. 7 is a top plan view of the rotatable head shown in FIG. 1, employing a scale similar to that used in FIGS. 2 and 3, and part of the structure being broken away to better illustrate details of certain aspects thereof.

FIG. 8 is a side elevation of the head shown in FIG. 7.

FIG. 9 is a vertical sectional view taken on the line 9—9 of FIG. 7 but employing a larger scale than FIG. 7.

FIG. 10 is a fragmentary vertical elevation showing the driving pinion for the rack carried by the bottom surface of the boom which is fragmentarily illustrated in phantom on a scale similar to that used in FIG. 9.

FIG. 11 is a side elevation of a fragmentary portion of the boom and rack connected thereto, to illustrate the sectional characteristics of the rack.

FIG. 12 is a side elevation, partly broken away intermediately the upper and lower ends thereof to foreshorten the view, of the supporting means for the head of the hoist, including the bracing means therefor, certain of the thrust and radial bearing structures which are partially illustrated in vertical sectional elevation to show details, and the power means for rotating the spindle which supports the head at its upper end.

FIG. 13 is a vertical elevation, partly in section, as seen on the line 13—13 of FIG. 12 and showing details of the driving means for rotating the spindle for the head of the hoist.

FIG. 14 is an end elevation, broken away intermediately of the upper and lower ends thereof to foreshorten the view, showing the supporting collar and bracing mechanism at a view seen at 90° about the vertical axis of the spindle to that shown in FIG. 12.

FIG. 15 is a top plan view of the supporting and bracing mechanism shown in FIG. 14.

Figure 16:
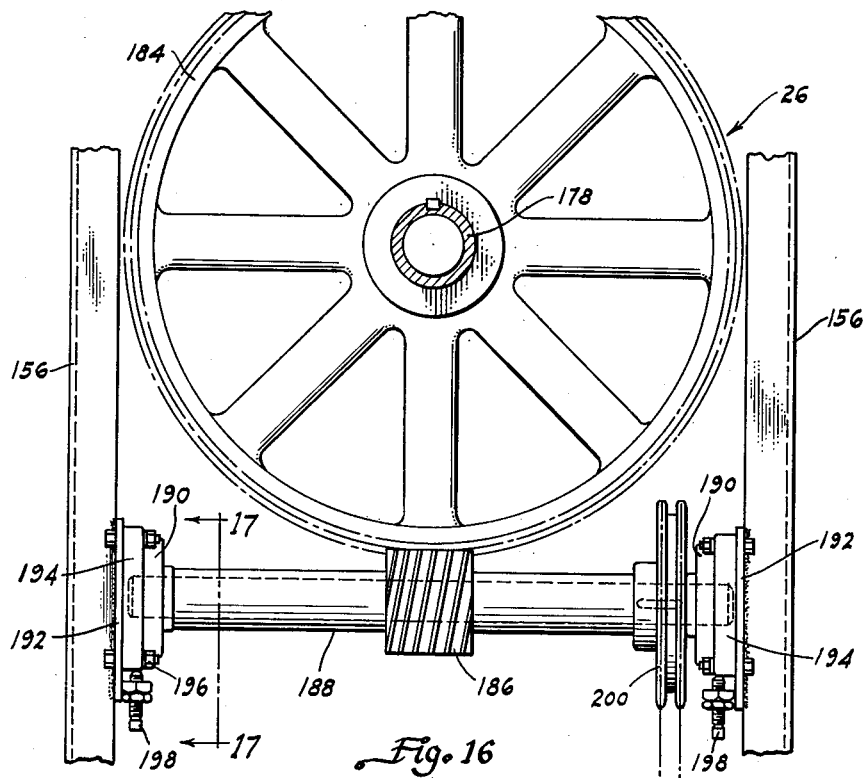

FIG. 16 is a fragmentary top plan view showing the worm gear and driving worm therefor by which the spindle supporting the head of the hoist is rotated, said view also illustrating mechanism for driving the worm and adjusting the worm shaft to effect desired engagement of the worm with the worm gear.

Figure 17:
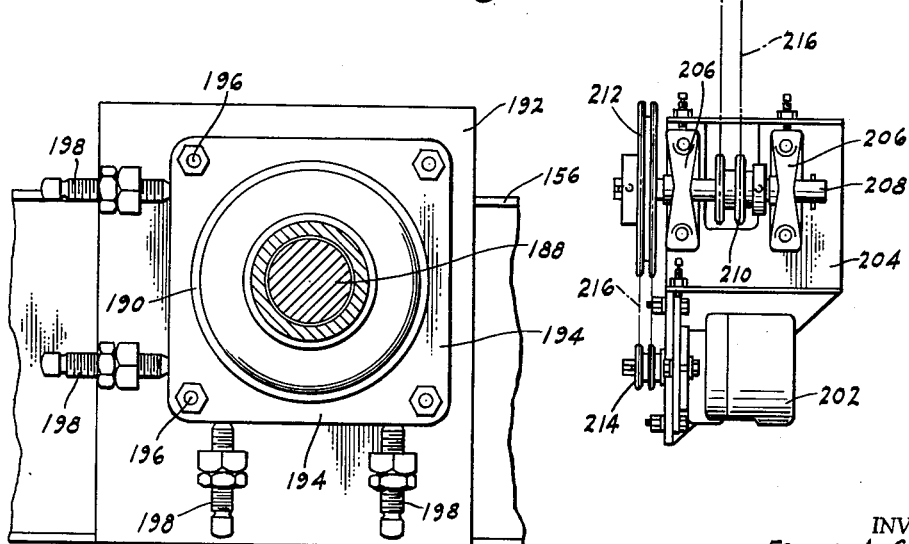

FIG. 17 is an enlarged vertical elevation, partly in section, taken on the line 17—17 of FIG. 16, and showing details of the adjusting mechanism for the bearings of the shaft which supports and drives the worm shown in FIG. 16.

Referring to FIG. 1, the hoist assembly 10 which embodies the principles of the present invention is illustrated, in perspective view, connected to the chassis of a vehicle specifically shown as an automobile truck 12. The chassis 14 of the vehicle 12 supports a bed 16 which is fabricated to produce adequate strength to resist relatively rough usage and to hold loads of heavy weights such as a plurality of cubes of concrete blocks. It is not uncommon for vehicles of this type, exclusive of trailer-type vehicles, to hold as many as ten full cubes of concrete blocks, said individual cubes weighing in excess of 4,000 pounds, whereby it will be seen that the total loads sustained by the chassis and bed of the vehicle is substantial.

The hoist assembly may either be installed upon the chassis of the vehicle 12 at the shop or yard of a distributor or sales agent, as well as at the factory of the manufacturer, or said assembly may be dis-assembled a certain amount, to be described hereinafter, and shipped as a "package" to a customer from the factory of the manufacturer. Under such latter circumstances, it will be necessary to install the components of the assembly upon a customer's truck chassis at a shop having hoist or crane equipment sufficiently heavy to handle the various components while they are being mounted and connected into a completed assembly such as that illustrated in FIG. 1.

The assembly 10 comprises principal components including a head unit 18, a longitudinally movable boom assembly 20 which is supported by said head for movement substantially to and fro within a horizontal plane, a hoisting cable assembly 22, a supporting and bracing unit 24, and a spindle rotating power unit 26 which is best shown in FIG. 16. Inasmuch as the boom assembly 20 is supported by the head unit 18, there is close cooperation between the same and they will be described in conjunction with each other, as follows. As best shown in FIG. 4, wherein the actual boom 28 of the boom assembly 20 is shown in transverse sectional view, it will be seen that said boom comprises an I-beam of conventional shape and construction, whereby cost is minimized. However, hoists of this type, in order to be of maximum use, must employ a boom which may be extended, at a maximum, within the order of 17 or 18 feet from the axis about which the head unit 18 rotates. In order that specially rolled I-beam sections need not be employed, or that I-beams of unusually large size, and correspondingly heavy weight, need not be employed, it has been found in accordance with the principles of the present invention that an I-beam having a vertical dimension in the direction of its web, of approximately 8 inches may be employed if suitably braced by auxiliary means. It has been found that adequate bracing can be obtained by employing a plurality of heavy-walled tubes 30 which are disposed abuttingly against the surfaces of the webs and flanges of the I-beam boom 28, and secured firmly thereto so as to be integral therewith, by means of either continuous or a series of shorter lengths of weldments 32 which are best shown in FIGS. 2 and 4. The tubes 30 have substantially thicker walls than conventional pipe and, in the preferred embodiment of the invention, the tubes 30 are formed from cold-rolled steel, whereby the same are free from scale on the exterior. This is desirable in that the tubes 30 have a dual function; they also comprise elongated tracks which are engaged by grooved rollers 34 which are rotatably supported by the opposite sides 36 of head unit 18, as shown to best advantage in FIG. 9. It will be understood that the effective maximum length of the boom 18 is the distance between the outer or forward end thereof and the vertical axis of rotation of the head unit 18 when the boom is moved fully forward but the rear end thereof is still completely contained within and supported by the head unit 18.

Referring particularly to FIGS. 7 through 9, it will be seen that the head unit 18 comprises a pair of complementary sides 36 which preferably either are cast steel or forged steel. It will be seen that the rear ends 38 of sides 36 are somewhat longer than the front ends 40 thereof and said sides are also formed with arcuate portions 42 intermediately of the ends thereof as best seen in FIG. 7, for purposes of said arcuate portions cooperating with each other to form a socket to receive the cylindrical upper end 44 of spindle 46. Preferably, the arcuate portions 42 do not abut each other as is evident from FIG. 7, whereby there is a predetermined space capable of accommodating vertical keys 48 which preferably extend diametrically in opposite directions from each other at opposite sides of the upper end 44 of spindle 46, thereby keying the head unit 18 to the spindle 46 when the sides 36 of the head unit are secured together.

A plurality of securing means for the sides 36 are provided. The central portions of the sides 36 are firmly clamped about the upper end 44 of spindle 46 by a plurality of bolts 50. Inasmuch as the front and rear ends of the sides 36 extend substantial distances from the middle of said sides however, additional bracing and spacing yokes 52 are provided, secured by suitable bolts 54 to the sides 36. The yokes 52 are U-shaped and are open at the top, whereby there is an open space between the upper edges of sides 36 to freely accommodate units and elements of the hoisting cable assembly 22, details of which are described hereinafter.

Extending through and supported by suitable bosses 56, cast or otherwise formed within the sides 36, are a plurality of shafts 58, the inner ends of which have broad, flat heads which are hardened and have rounded edges, said heads being spaced determined distances apart transversely to sides 36 an adequate amount to permit passage of the central web of the I-beam boom 28 as clearly shown in FIG. 9. The shafts 58 support suitable anti-friction bearings 60 of the heavy-duty type, which rotatably support the grooved rollers 34. The grooves of said rollers 34 are preferably substantially complementary to the exterior cylindrical surfaces of the heavy walled tube tracks 30 and a very limited amount of clearance, in a vertical direction, is afforded, of the order of 1/16", for example. As shown in FIG. 9, the grooves of rollers 34, at the inner edges thereof, extend above a horizontal tangent to the bottom of the grooves of the rollers and the inner faces of said rollers are rounded and hardened. While the engagement of the grooved rollers with tube tracks 30 mainly positions the boom 28 laterally, the engagement of the web of boom 28 with the rounded heads of shafts 58 and rounded inner ends of rollers 34 also effectively limits lateral movement between the boom and sides 36.

By reference to FIG. 7 particularly, it will be seen that there are pairs of the rollers 34 at opposite ends of each side 36, as well as there being opposing pairs of said rollers which substantially are in axial alignment with each other. The shafts 58 are firmly secured to the sides 36 by clamping nuts 62 acting against the inner races of bearings 60. Shafts 58 preferably are drilled to provide lubricating channels 64, whereby the bearings 60 readily may be provided with lubricant and some lubricant also readily migrates past the heads of the shafts 58 and is spread upon the web of boom 28, thereby lubricating the sides thereof.

Since the sides 36 of the head 18 are held firmly against separation by the yokes 52 and clamping bolts 50, and also, due to the innermost flanges of the grooved rollers 34 extending substantial distances in a radial direction so as to engage appreciable surfaces of the reinforcing tube tracks 30, should one or a number of the weldments 32 break, such separated portions of the tubes 30 nevertheless will be maintained in operative position relative to boom 28. Thus, there is no danger of said tubes 30 fouling the operation of the hoist assembly even if they should become partially separated from the boom 28. It is apparent from FIG. 2 particularly that the weldments 32 readily are accessible for re-welding should fracture occur.

To propel the boom assembly 20 in opposite directions relative to the head unit 18, the I-beam boom 28 is provided along its lower surface with a continuous rack 68 which is secured between suitable means, one preferred embodiment of which comprises a plurality of angle members 70, one flange of each of which is secured to the bottom face of the lower flange of I-beam boom 28 by welding or any other suitable means, whereby the opposite walls of the angles 70 are spaced transversely apart but are parallel to each other to receive closely therebetween preferably abutting elongated sections of a steel rack 68 which, as shown in FIG. 11, are firmly secured to the angle members 70 by a series of spaced bolts 72.

Carried by one of the sides 36 of the head unit 18 is a power unit which, in the preferred embodiment of the invention, comprises a hydraulic motor 74 which actuates a gear reduction unit 76 having a shaft projecting therefrom to which is keyed a driving pinion gear 78 which meshes with the continuous rack sections 68. The hydraulic motor 74 preferably is of the reversible type, whereby the direction of rotation of the motor, and correspondingly of the driving pinion gear 78, may be selected by the operator at will, through actuation of the switches for said motor upon portable control head 79 which is shown in exemplary manner in FIG. 1, it being understood that the control head 79 contains a plurality of switches, selectively operable to control all of the power units of the hoist assembly, including the hydraulic motor 74 and all other power means to be described hereinafter.

A suitable flexible cable 80 of appropriate length is arranged to extend between the control head 79 and a multi-unit electrically controlled valve assembly, not shown, of conventional construction, utilized for purposes of controlling the feed of hydraulic fluid, under pressure, from exemplary and diagrammatically illustrated hydraulic pump unit 82 shown in FIG. 1. The latter pumps hydraulic fluid from an exemplary reservoir 84 and said pump unit and reservoir are appropriately carried at any desired position upon the truck such as directly below the bed 16 thereof as shown in FIG. 1.

It will be understood that suitable fluid conduit lines will lead from the pump and control valve to the hydraulic motor 74 and similar hydraulic power units and motors to be described hereinafter, in accordance with conventional hydraulic power practice, whereby it is believed unnecessary to illustrate a specific diagram of the power circuit. One example of an appropriate circuit however is illustrated in FIG. 8 of the aforementioned reissue patent, it being understood that the units operated by such circuit in the instant invention will be somewhat different from those operated by the circuit illustrated in said reissue patent.

The hoisting cable assembly 22, details of which are best shown in FIGS. 3 through 5, is supported by and is operable upon the boom assembly 20, whereby as the boom assembly 20 is moved longitudinally to any desired position relative to the head unit 18, said hoisting cable assembly 22 moves therewith. The power means of the hoisting cable assembly 22 comprises a hydraulic cylinder 86 of the double-acting type and a piston rod 88 extending from one end of the cylinder 86 and which is connected at its outer end to movable sheave 90 of a double sheave unit of a cable block set. The other sheave unit 92 of said set is stationarily mounted relative to one end of the boom 28 by any suitable means such as bolts 94. The end of the hydraulic cylinder 86 opposite the end from which the piston rod extends is connected to suitable bracket means such as a pair of spaced ears 96 which may be secured either permanently to the top of boom 28, such as by welding, or adjustably to the upper flange of boom 28 by means to be described.

For purposes of suitably guiding the movement of sheave unit 90 longitudinally along boom 28, said unit includes opposed slidable guide members 98 which are connected to opposite sides of a boss 100 which depends below the sheave unit 90 and is transversely apertured to receive clamping bolts 102 which likewise extend through the guide members 98. When the bolts 102 are tightened, there will be adequate freedom between the illustrated guide grooves shown in FIG. 4 in guide members 98 to permit ready sliding of the sheave unit 90 along the upper flange of the boom 28.

If desired to have the bracket 96 adjustable relative to the boom 98, clamping means similar to the guide members 98 may be utilized but, of such nature that when the clamping bolts are tightened upon the opposite edges of the top flange of the boom 28, firm frictional clamping and securing of the bracket 96 to the boom 28 will be effected. Such adjustment may be desirable when, for example, it is desired to replace a certain length of cylinder 86 and piston rod 88 with either a longer or shorter one, depending upon whether a greater or lesser amount of travel of the outer end of the hoisting cable 104 is desired.

From FIGS. 1 through 3, it will be seen that the hoisting cable 104 extends around the individual sheaves of the block assembly comprising movable and stationary sheave units 90 and 92. One end 106 of the cable is secured to an anchor 108, and after the cable passes around the sheaves of the units 90 and 92, the opposite end thereof extends through a suitable fixed guide 110 and a guide pulley 112 which is carried by a suitable bracket fixed to the boom 28, and finally extends around outer guide pulley 114. It thus will be seen that a single cable 104 depends from the outer guide pulley 114 and is connected to the load supporting member such as fork 66. Such an arrangement affords maximum longitudinal movement for the cable 104 relative to the number of passes thereof through the sheave units 90 and 92 of the block. Further, it has been found that such an arrangement also minimizes rocking and twisting of the load depending from the outer end of cable 104.

The outer end of hydraulic cylinder 86 is provided with a conventional packing nut 116. Further, the outer guide pulley 114 is rotatably supported within a pulley head 118 which is suitably riveted or bolted to the forward end of boom 28, said head abutting against the outer end of the boom so as to provide a firm connection between the elements, particularly when the cable 104 is being subjected to a heavy load.

Referring to FIG. 3, it will be seen that hydraulic fluid is fed to the opposite ends of the cylinder 86 by means of a pair of flexible conduits, such as hoses 120. One end of each of said hoses respectively are connected to elbows 122 or the like which communicate respectively with opposite ends of the interior of the cylinder 86, and the oppoiste ends of the conduits 120 extend into the opposite side of the head 18 from that shown in FIG. 1. The length of the conduits 120 is such that they are sufficiently long that there is ample possibility of the boom 28 to be moved from one end to the other relative to the head 18 without fouling or injuring the conduits 120. Further, a flexibly mounted bracket arm 124, which is secured at its inner end to coiled spring 132, has a guide ring 128 on the outer end thereof. Spring 132 is fixed to and projects laterally from the supporting bracket 130 which is fixed to the boom 28. The spring 132 normally holds arm 124 so as to extend laterally from bracket arm 124 but is capable of yielding when the movement of the boom 28 is such as to require movement of the bracket arm 124 in one direction or the other relative to bracket 130. Fixed guide rings 126 are supported by boom assembly 20 to guide conduits 120 during movement of arm 124. Such arrangement is shown to advantage, on a larger scale in FIG. 6 than that employed in FIG. 3. The actuation of the piston within cylinder 86 is controlled by certain switch buttons on the control head 78 by reason of the provision of suitable hydraulic conduits through the hollow spindle 46, which conduits communicate with a suitable hydraulic swivel, not shown, adjacent the lower end of the spindle below the bed 16 of the vehicle.

Details of the supporting and bracing unit 24 are shown to best advantage in FIGS. 12 through 15. FIG. 12 shows the supporting and bracing structure as viewed from either the front or rear end of the bed 16 of the vehicle. The principal supporting member of unit 24 comprises a collar 134 having an internal cylindrical recess 136 containing radial bearing means 138, specifically comprising needle bearing rollers, which are engaged by the upper portion of the spindle 46. The upper portion of collar 134 has a horizontal annular seat 140 thereon against which the lower race of an annular thrust bearing 142 abuts. Disposed against the upper race of thrust bearing 142 is a thrust plate 144 against which the weight of head 18 is imposed.

FIG. 12 also affords details of the key means 48 for securing the head and boom against rotation relative to spindle 46. It will be seen that keys 48, as viewed in FIG. 7, actually preferably comprise a single key plate projecting from opposite sides of the upper end of spindle 46, whereby said key plate also is designated 48. The key has holes 146 therethrough for reception of the clamping bolts 50 which secure the sides 36 together as a unit to constitute the head unit 18. Diametrically opposite walls of the tubular spindle 46 are slotted longitudinally to receive the keying plate 48. The slotted upper end of the spindle 46 will be maintained against spreading however due to the effective clamping of the sides 36 around the keyed upper end of the spindle by bolts 50.

Supporting collar 134 principally is held against vertical downward movement, as well as being braced against transverse movement toward opposite sides of the bed 16 of the vehicle, by sturdy lateral braces 148. For simplicity, coupled with adequate rigidity and strength, said braces 148 preferably comprise longitudinal halves of a heavy gauge steel tube. Supporting collar 134 is provided with an annular, radially extending flange 150 which, on opposite sides thereof, has abutment seats 152 engageable by the upper ends of semi-circular, lateral braces 148, said upper ends preferably being welded to the seats 152.

It will be seen that the lateral braces 148 extend downwardly and outwardly from the supporting collar 134, and the lower ends thereof are provided with appropriately shaped notches 154 to permit close engagement of the edges of said notches with the top and side flanges of stringer channel members 156 which extend longitudinally of the vehicle chassis 14. The lower, notched ends of lateral braces 148 are secured to the channel members 156 preferably by welding. Said members 156 rest on top of the longitudinal chassis members, being bolted or otherwise secured thereto, in accordance with conventional practice in the mounting of truck bodies and beds upon the chassis of trucks. The semicircular shape of the lateral braces 148 is highly suited to prevent any tendency of the supporting collar 134 to twist or skew about the vertical axis of the spindle 46, even when the head unit and boom assembly are rotated about the axis of the spindle 46 while supporting very heavy loads. In addition to supporting such load and resisting vertical thrust downward, the lateral braces 148 likewise resist any tendency to tilt the spindle 46 in either lateral direction toward the opposite sides of the bed 16 of the vehicle.

It is essential that the spindle 46 have appreciable diameter, for example, of the order of between 6 and 8 inches, for example, so as to be capable adequately of resisting bending moment imposed upon the upper end of the spindle 46 by the head and boom, particularly when the boom is fully extended toward its forward end and has a heavy load such as a full cube of concrete blocks suspended therefrom. Hence, it is preferred that the compression-sustaining lateral braces 148 extend in opposite directions from each other and transversely to the longitudinal axis of the bed 16 of the vehicle 12, whereby when cubes of concrete blocks are loaded upon the bed 16, the only appreciable loss in load-carrying area of the bed 16 comprises approximately 8 inches in the longitudinal length of the bed 16, which distance is occupied by the spindle 46 and braces 148. This arrangement of braces and the conservation of space comprises one aspect of the structure covered by aforementioned Reissue Patent No. 24,334 but the braces employed in the instant invention are substantially different from those covered by said reissue patent in that the braces 148 sustain substantially all of the vertical thrust imposed upon the spindle 46, whereas other structure sustains such vertical thrust in the structure covered by said reissue patent.

To prevent any tendency of the spindle 46 to tilt in either direction longitudinally of the bed 16 of the vehicle 12, additional thin and relatively wide longitudinal braces 158, preferably formed from flat strips of steel of the order, for example, of approximately ½" thickness, and between 4 and 6 inches wide, are disposed substantially within a common vertical plane extending longitudinally of the bed 16 and midway of said bed in a transverse direction. It will be seen that the supporting collar 134 is provided with vertically extending pairs of laterally spaced ears 160 which receive the upper ends of the longitudinal braces 158 therebetween, said braces preferably being detachably secured therebetween by any suitable means such as bolts 162.

Referring to FIG. 12, it will be seen that the longitudinal braces 158 extend downwardly and outwardly from the supporting collar 134 and the lower ends thereof have threaded tensioning rods 164 secured to said lower ends by welding or otherwise. Extending transversely between the longitudinal channel members 156 and secured at the opposite ends to the inner surfaces of said channel members, are additional pairs of smaller channel members 166, the channels of which face each other as best shown in FIG. 12. Channel members 166 may be secured to the inner surfaces of longitudinal channel members 156 by welding, for example. The flanges of smaller, facing pairs of channel members 166 are drilled intermediate the ends thereof to accommodate the tensioning rods 164 and suitable washer members 168 and clamping and lock nuts 170 are mounted upon the lower threaded ends of tensioning rods 164 to place the longitudinal braces 158 under adequate tension to resist and prevent any tendency of the spindle 46 to tilt in either direction longitudinally of the bed 16.

The preferred construction of vehicle bed with which the present invention is intended to be used comprises, in addition to the stringer channel members 156, a series of transverse bed-supporting channel members 172 which are best shown in FIGS. 12 and 13. These are of smaller size than the channel members 156 and they are placed at intervals of the order of 1 foot in distance from each other, the same being secured to the longitudinal channels 156 by suitable means such as welding at the points of engagement of the transverse channel with said longitudinal channels. Finally, a deck plate 174, of suitable gauge steel, for example, is fastened, by welding or otherwise, to the upper flanges of the transverse channels 172. Appropriate vertical finish strips 176 of steel, or the employment of longitudinal channels, with the transverse web disposed outwardly, may be disposed along opposite sides of the bed 16 of the vehicle to afford a finished effect, said finishing strips being affixed by any suitable means such as welding.

From FIGS. 12 and 14, it will be seen that the lower end of spindle 46 is reduced in diameter to provide a hollow end 178 which extends through the inner race of a lower radial bearing 180 carried within a suitable housing 182 which is supported between a pair of transverse channel members 172 as clearly shown in FIG. 11. Mounted upon the lower extremity of hollow end 178 of spindle 46 is spindle-rotating means which, in the preferred embodiment of the invention comprises a relatively large worm gear 184. Said worm gear is driven by worm 186 carried by shaft 188 which extends transversely between the stringer channel members 156, as clearly shown in FIG. 13.

Adjustably mounted bearings 190 receive opposite ends of shaft 188. Welded or otherwise secured to the inner edges of the side flanges of longitudinal channel members 156 are a pair of similar vertical supporting plates 192. Bearing plates 194 have holes in the corners thereof which respectively receive clamping bolts 196, as best seen in FIG. 17. The holes which receive the bolts 196 have larger diameters than said bolts, whereby a limited amount of adjustment of the bearing plates 194, in both vertical and horizontal directions, relative to the supporting plates 192, is permitted. Suitable jack screws 198 are threadably carried by supporting plates 192 for engagement with angularly related edges of adjustable bearing plates 194, whereby either or both of the bearings 190 may be adjusted either vertically or horizontally as desired, to effect desired meshing of worm 186 with worm gear 184. Such means afford easy and ready adjustment between the worm and worm gear, especially after a certain amount of wear has taken place and take-up is desired to be effected between the worm and worm gear.

The shaft 188 and, correspondingly, the worm 186, are driven by suitable means such as sprocket gear 200 which is fixed to said shaft. By referring to FIG. 16, it will be seen that appropriate speed reduction is effected between the sprocket gear 200 and a hydraulic motor 202, of the reversible type, which is carried, adjustably, by a suitable support plate 204 which is connected, for example, to one of the channel members 156 beneath the deck plate 174. Support plate 204 carries a pair of spaced bearings 206 which rotatably support intermediate shaft 208 having a relatively small diameter sprocket gear 210 keyed thereto. Suitably keyed to one outer end of intermediate shaft 208 is a large diameter sprocket gear 212 which is driven by a much smaller diameter drive sprocket gear 214 keyed to the drive shaft of hydraulic motor 202. Suitable sprocket chains 216 extend respectively around sprocket gears 200 and 210 and sprocket gears 212 and 214. As illustrated, said sprocket gears and chains are of the multiple link type commonly employed in many types of mechanisms where heavy driving requirements are necessary.

It will be understood that the hydraulic motor 202 is connected by suitable hydraulic conduits to the hydraulic pump unit 82, as are the hydraulic motor 74, which propels the boom, and the hydraulic cylinder 86, which actuates the hoisting cable. Likewise, the hydraulic motor 202 is controlled by an appropriate pair of switches included in the portable control head 79. Thus, it will be seen that complete automatic control and operation of longitudinal movement of the boom in either direction, raising and lowering movement of the hoisting cable 104, and rotation of the spindle 46 with the head 18 and boom assembly 20 carried thereby, is accomplished by an operator who merely has to carry the small control head 79 with him while unloading and/or loading material, such as cubes of concrete blocks, from or onto the bed 16 of the vehicle. Limited manual assistance sometimes is necessary to insert the tines of the fork 66 within aligned core holes in the lower layer of concrete blocks, for example, as well as aid in removing the tines of the fork 66 from the cubes of blocks when a cube has been unloaded from the vehicle. Other than this however, no manual operation of any kind is required except for the pushing of the switch buttons of the control head 79.

While the inherent rigidity of boom 28 is augmented by tubes 30 as to resist bending to a substantial degree, the boom 28 nevertheless will flex or bend a certain amount, especially when the boom is extended a substantial amount at its forward end from head 18 and a heavy load, within the capacity of the hoist, is connected to the hoisting cable 104. In view of this, the position of the driving pinion gear 78 in the head 18 relative to the supporting rollers 34 has been selected deliberately, by specific design, so as to insure adequate meshing of gear 78 with rack 68 under all conditions of operation. Also, the rack purposely has been mounted upon the lower surface of the bottom flange of boom 28. Thus, when the boom flexes under load, there is a tendency for the boom to curve upwardly between the forward and rearward sets of rollers 34 as can best be visualized from FIG. 1 when considering that gear 78 is co-axial of gear reduction unit 76. Since gear 78 is near the rearmost rollers 34 adjacent the rear spacing yoke 52, only very little separative flexing movement of the rack 68 on boom 28 occurs relative to pinion gear 78. Further, by placing the rack 68 on the bottom of boom 28, and flexing will result in a limited tendency to separate the rack from the pinion gear rather than crowd or jam the two together, which would result possibly in the driving mechanism for the boom "freezing" and also probably becoming damaged.

After a load has been discharged from the vehicle, the boom preferably is positioned as illustrated in FIG. 1, wherein the forward end thereof is extended substantially relative to the head 18, in a direction forwardly of the bed 16, whereby the forward end of the boom rests upon a suitable support 218 carried by the upper edge of forward guard grill 220 carried by the forward end of the bed 16 so as to protect the cab of the vehicle. The fork 66 rests upon the bed of the vehicle adjacent the guard grill 220, for example, in which position it may be maintained by suitably tensioning the forward end of the hoisting cable 104.

When the hoist assembly 10 is to be shipped as a package unit, for example, the head unit 18 and boom assembly 20 are assembled at the factory and include the hoisting cable assembly 22 therewith. Clamping bolts 50 are removed or loosely mounted within the holes therefor but the spacing yokes 52 are adequate to maintain the sides 36 of the head unit in operative position relative to each other and maintain them in such position. Said sub-assembly thus described may be crated or shipped either upon a truck or railway car. In addition, the longitudinal braces 158 are detached from the supporting collar 134 but the connected supporting collar and transverse braces 148 may be shipped as a unit, either crated or otherwise. If desired, the spindle 46 may be included with the supporting collar and transverse brace sub-assembly. The drive mechanism such as shown in FIG. 16, for rotating the spindle 46 readily is adapted to be separately packaged for connection to the understructure of the bed of the vehicle when received by the customer. It will be necessary to also either ship a fabricated bed 16 from the factory or, if the hoist assembly is to be mounted upon a conventional bed of a truck owned by the customer, a few holes will have to be cut in the deck of the bed to accommodate the lower ends of the lateral and transverse braces, as well as the spindle 46. Many types of garages and construction shops have suitable equipment to perform such preparation of the bed to receive the hoist assembly, including welding where necessary as indicated in the foregoing description.

While the invention has been described and illustrated in its several preferred embodiments, it should be understood that the invention is not to be limited to the precise details herein illustrated and described since the same may be carried out in other ways falling within the scope of the invention as claimed.

We claim:

1. A hoist of the type attachable to the bed of a vehicle to lift loads to and from said bed and comprising in combination, a substantially T-shaped head having an elongated channel-like passage extending longitudinally of the upper portion of said head in a normally horizontal direction and open longitudinally along the top of said head, means on the lower portion of said head connectable to supporting means permitting rotation of said head about a normally substantially vertical axis, an elongated boom mounted within said channel-like passage of said head and comprising an I-beam positioned with the web of the beam substantially vertically and the top and bottom flanges thereof being substantially horizontal in use, bracing means fixed to said I-beam and extending longitudinally thereof to brace the same against appreciable deflection when sustaining a load, supporting rollers carried by said head and engaging said boom to support the same for movement longitudinally of said head, elongated load hoisting means carried by the top of said boom intermediately of the ends thereof and extending above said head, said hoisting means being movable through the longitudinal open top of said head as said boom is moved longitudinally of said head, and means engaging said boom and operable to move the same selectively in opposite directions longitudinally of said head.

2. The hoist set forth in claim 1 further characterized by said head comprising a pair of transversely spaced elongated side members having means spaced longitudinally therealong and projecting from the inner faces thereof toward each other and rotatably supporting said supporting rollers for said boom, and said rollers being compactly disposed between the upper and lower flanges of said I-beam comprising said boom and adjacent to said web of said I-beam for supporting interengagement with said boom.

3. The hoist set forth in claim 2 further characterized by said bracing means also comprising track means and the same being disposed between the top and bottom flanges of said boom and energized by said supporting rollers, said hoist further including power means carried by said head and having a drive gear engageable with complementary means on said boom to move the same longitudinally of said head in opposite directions.

4. The hoist set forth in claim 2 further characterized by said load hoisting means comprising a hydraulic cylinder and piston unit having a piston rod projecting from one end and said hoist also including a set of sheaves around which said hoisting cable extends, one of said sheaves being fixed to the top flange of said boom adjacent one end thereof and the other sheave being connected to the end of said piston rod of said hydraulic cylinder unit adjacent to said one sheave and said hoisting cable extending over guide means at the other end of said boom.

5. A hoist of the type attachable to the bed of a vehicle and comprising in combination, an elongated boom means having a substantially vertical web and transverse bracing flanges fixed thereto adjacent to the upper and lower edges of said web and extending laterally outward therefrom in opposite directions, track means connected to said transverse bracing flanges and extending longitudinally of said beam means between the upper and lower surfaces of said boom means and spaced vertically to provide a space therebetween, a T-shaped head having an elongated passage extending substantially horizontally therethrough and receiving said boom for movement in opposite directions longitudinally of said passage, supporting rollers carried by the opposite sides of said head adjacent the opposite ends thereof and positioned within said space between said track means of said boom to engage the same and support said boom against appreciable vertical movement of the ends thereof, actuating means carried by said head and engageable with said boom to move said boom longitudinally relative to said head, means on said head arranged to be connected to means to support said head for rotation about a substantially vertical axis, hoisting cable means carried by said boom and movable therewith, and power means carried by the top of said boom and extending above said head for movement therewith relative to said head, said power means being connected to said hoist cable means and operable to raise and lower loads from one end of said boom.

6. A hoist of the type attachable to the bed of a vehicle and comprising in combination, an elongated I-beam boom having the web thereof positioned substantially vertically, track means fixed securely to and extending longitudinally of said boom at opposite sides of the web thereof and adjacent both the upper and lower flanges thereof to brace the boom and also provide a space between said track means, a T-shaped head having transversely spaced sides connected at the lower portions and providing an elongated passage therebetween extending substantially horizontally through said head and receiving said boom for movement in opposite longitudinal directions, the upper portions of said sides being separated to provide a longitudinal space at the top of said head, supporting rollers carried by said sides of said head and adjacent the opposite ends thereof, said rollers being disposed within the space between and engageable with the upper and lower track means of said boom to support said boom for movement relative to said head, actuating means carried by said head and engageable with said boom to move said boom longitudinally relative to said head, means on said head arranged to be connected to means to support said head for rotation about a substantially vertical axis, hoisting cable means carried by said boom and movable therewith, and power means comprising a hydraulic cylinder unit connected to said hoist cable means and carried fixedly by the upper flange of said boom and projecting through the longitudinal space at the top of said head for movement with said boom relative to said head and operable to raise and lower loads from one end of said boom.

7. The hoist set forth in claim 6 further characterized by said track means comprising heavy gauge cylindrical tubes secured respectively to the boom within corners between the web and flanges thereof, and said supporting rollers having concave annular grooves thereon engageable with and substantially complementary to the outer surfaces of said track tubes.

8. The hoist set forth in claim 6 further characterized by said head being bi-partite and separable along a plane parallel to and substantially midway between the sides of said head, said separable sides being connected together to clamp said head to the upper end of means to support said head for rotation about a vertical axis.

9. A hoist of the type attachable to the bed of a vehicle and comprising in combination, an elongated boom formed from a structural steel I-beam mounted with the web thereof vertical and having forward and rearward ends, vertically spaced track means fixed to and extending longitudinally of said beam means at opposite sides thereof and having spaces therebetween, a T-shaped head having a channel open at the top extending substantially horizontally through said head and receiving said boom for movement in opposite longitudinal directions, supporting rollers carried by said head at opposite sides of said channel and adjacent the opposite ends thereof, said rollers being disposed within said spaces between said track means of said boom and engaging said track means to support said boom, actuating means carried by said head and engageable with said boom to move said boom longitudinally within the channel of said head, means on said head connectable to supporting means permitting rotation of said head about a substantially vertical axis, a hydraulic cylinder and piston power unit carried by the top of said boom and extending longitudinally intermediately of the ends thereof and upwardly therefrom, bracket means connecting said unit to the upper flange of said boom for longitudinal adjustment thereon, cable block units carried by the top of said boom and one of said units being interconnected to the piston of said power unit and movable thereby, additional bracket means connecting said other block unit to said boom adjacent one end thereof, and a flexible cable carried by said block units and operable thereby to move a single length of said cable including the hoisting end thereof extending over a guide pulley at the forward end of said boom in directions to raise and lower loads, said hydraulic power unit being movable through the open channel at the top of said head as said boom moves longitudinally relative to said head.

10. The hoist set forth in claim 9 further characterized by said head having a hydraulic power outlet, flexible conduits connected between said power outlet and opposite ends of said hydraulic cylinder, and supporting arm means projecting laterally relative to one side of said cylinder, said arm means engaging said flexible conduits intermediately of the ends thereof and being operable to hold the same out of contact with said head during longitudinal movement of said boom relative to said head.

11. The hoist set forth in claim 10 further characterized by said supporting arm means being flexibly connected adjacent one end to said boom means for movement substantially within a horizontal plane toward and from opposite directions relative to said head.

References Cited in the file of this patent

UNITED STATES PATENTS

| | | |
|---|---|---|
| 1,611,326 | Abbe | Dec. 21, 1926 |
| 2,272,949 | Kidder | Feb. 10, 1942 |
| 2,382,299 | Deiters | Aug. 14, 1945 |
| 2,415,907 | Pierce | Feb. 18, 1947 |
| 2,462,926 | Wilson | Mar. 1, 1949 |
| 2,478,094 | Gelbman | Aug. 2, 1949 |
| 2,547,398 | Lee | Apr. 3, 1951 |
| 2,607,500 | Frink | Aug. 19, 1952 |
| 2,772,795 | Cramer | Dec. 4, 1956 |
| 2,993,605 | Smith | July 25, 1961 |
| 3,032,213 | Bopp | May 1, 1962 |
| 3,093,248 | Winter | June 11, 1963 |